(12) United States Patent
Yamamoto et al.

(10) Patent No.: US 7,988,897 B2
(45) Date of Patent: Aug. 2, 2011

(54) MANUFACTURING METHOD OF SYNTHETIC RESIN HOLLOW BODY

(75) Inventors: Sadaki Yamamoto, Ichihara (JP);
Kazuyuki Oogi, Ichihara (JP);
Masanobu Sato, Ichihara (JP)

(73) Assignee: Du Pont-Mitsui Polychemicals Co., Ltd., Minato-Ku, Tokyo (JP)

( * ) Notice: Subject to any disclaimer, the term of this patent is extended or adjusted under 35 U.S.C. 154(b) by 0 days.

(21) Appl. No.: 12/373,878

(22) PCT Filed: Jul. 18, 2007

(86) PCT No.: PCT/JP2007/064536
§ 371 (c)(1),
(2), (4) Date: Jan. 14, 2009

(87) PCT Pub. No.: WO2008/010600
PCT Pub. Date: Jan. 24, 2008

(65) Prior Publication Data
US 2010/0025895 A1 Feb. 4, 2010

(30) Foreign Application Priority Data

Jul. 19, 2006 (JP) ................................. 2006-197498
May 23, 2007 (JP) ................................. 2007-137210

(51) Int. Cl.
*B29C 45/14* (2006.01)
*B29C 49/20* (2006.01)
(52) U.S. Cl. ........................................ 264/275; 264/572
(58) Field of Classification Search ........................ None
See application file for complete search history.

(56) References Cited

U.S. PATENT DOCUMENTS

| | | | | |
|---|---|---|---|---|
| 3,037,652 A | * | 6/1962 | Wallace | 215/12.2 |
| 3,424,825 A | * | 1/1969 | Marchand | 264/45.4 |
| 6,216,922 B1 | * | 4/2001 | Bleile et al. | 222/402.1 |
| 6,866,158 B1 | * | 3/2005 | Sommer et al. | 215/12.1 |
| 7,569,171 B2 | * | 8/2009 | Dieudonat et al. | 264/275 |
| 2002/0175136 A1 | * | 11/2002 | Bouix et al. | 215/12.2 |
| 2003/0021917 A1 | | 1/2003 | Hotaka et al. | |
| 2004/0227272 A1 | | 11/2004 | Saito | |

FOREIGN PATENT DOCUMENTS

DE    19825158   * 4/1999
EP    1 457 302 A1   9/2004

(Continued)

OTHER PUBLICATIONS

Form PCT/ISA/210 (International Search Report) dated Oct. 23, 2007.

(Continued)

*Primary Examiner* — Edmund H. Lee
(74) *Attorney, Agent, or Firm* — Buchanan Ingersoll & Rooney PC

(57) ABSTRACT

A manufacturing method of a synthetic resin hollow body in which a molten resin is injected for an over-molding outside a hollow molding body made of a resin provided with a hollow body and at least an opening portion to form a resin sheathing body in an integrating manner with the hollow molding body. The method includes the step of injecting the molten resin for an over-molding under the state in which the hollow molding body is partially or wholly filled with a fluid substance. The manufacturing method of a synthetic resin hollow body is capable of suppressing resin cost and operation cost and can improve decorating property.

8 Claims, 11 Drawing Sheets

FOREIGN PATENT DOCUMENTS

| | | |
|---|---|---|
| FR | 2 485 987 | 1/1982 |
| JP | 49-036483 A | 4/1974 |
| JP | 49-87493 A | 8/1974 |
| JP | 52-159860 U | 12/1977 |
| JP | 57-043417 B | 9/1982 |
| JP | 58-169036 U | 11/1983 |
| JP | 59-150728 U | 10/1984 |
| JP | 6-023758 A | 2/1994 |
| JP | 7-178854 A | 7/1995 |
| JP | 07-223305 A | 8/1995 |
| JP | 8-252872 A | 10/1996 |
| JP | 09-011369 A | 1/1997 |
| JP | 9-156627 | 6/1997 |
| JP | 10-316123 A | 12/1998 |
| JP | 2001-122952 A | 5/2001 |
| JP | 2002-240206 A | 8/2002 |
| JP | 2003-245944 A | 9/2003 |
| JP | 2004-268456 A | 9/2003 |
| JP | 2004-083820 A | 3/2004 |
| JP | 2004-230876 A | 8/2004 |
| JP | 2004-527424 A | 9/2004 |
| JP | 2005-035575 A | 2/2005 |
| JP | 2006-082864 A | 3/2006 |
| JP | 2006-181161 A | 7/2006 |
| WO | WO 84/03065 | 8/1984 |

OTHER PUBLICATIONS

Extended Search Report from European Patent Office issued in corresponding European Patent Application No. 07768465.2 dated Feb. 28, 2011.

\* cited by examiner

MANUFACTURING METHOD OF SYNTHETIC RESIN HOLLOW BODY

TECHNICAL FIELD

The present invention relates to a manufacturing method of a synthetic resin hollow body (A) for holding a liquid material having a flow property such as a cosmetic solution, a chemical, and drinking water.

BACKGROUND ART

As a container for holding a liquid material such as a cosmetic solution, a chemical, and drinking water, a container with a cap having an excellent corrosion resistance and a satisfactory airtight property has been widely used. The container is generally made of a glass. In some cases, a metal container can also be used to obtain similar effects.

The glass container has a dignity sense and a high quality sense, thereby being suitably used for a container of a cosmetic solution in particular. However, in some cases, the glass container may be easily damaged by a shock during a carrying operation or by a drop in use.

On the other hand, the metal container has an excellent shock resistance in particular. However, a weight and a raw material cost thereof are increased, and a processing thereof has a lot of trouble.

In many cases, the glass container and metal container are in a simple shape, thereby being lacking in a decorating property.

As shown in FIG. 10, Patent document 1 proposes a composite container 104 in which a resin is over-molded on a container 100 made of a glass or a metal to form a resin sheathing body 102 outside the container 100 in order to add a design property.

On the other hand, in the case in which the container is made of a synthetic resin, the container is manufactured by a method such as a blow molding method and a method of forming two divided molding bodies in advance and of welding the two bodies using a vibration welding method, thereby reducing a manufacturing cost and enabling a mass production.

However, the blow molding method just enables a formation of only a thin-walled container. Consequently, a shape of the container is restricted to a certain degree, thereby being lacking in a decorating property in some cases.

Moreover, the method of welding the two divided molding bodies using a vibration welding method enables a manufacture of a container in a free shape as compared with the blow molding method. However, in the case in which a liquid material to be held in the container is a chemical or the like, a material of the container is restricted to a costly resin having an excellent chemical resistance, thereby increasing a resin cost disadvantageously.

As a method to solve the above problems, Patent document 2 discloses a synthetic resin hollow body 206 as shown in FIG. 11. To form the synthetic resin hollow body 206, an inner shell 200 is formed at first by combining divided molding bodies or by a blow molding method. A molten resin made of a material equivalent to or other than that of the inner shell 200 is then injected outside the inner shell to form an over-molded portion 202, thereby integrating the over-molded portion 202 with the inner shell 200.

Such a synthetic resin hollow body 206 has a two-layer structure, thereby further improving a decorating property. Moreover, a resin having an excellent chemical resistance can be used for only the inner shell 200, and a comparatively low cost resin can be used outside the inner shell, thereby reducing a total resin cost for the synthetic resin hollow body 206.

Patent document 1: Japanese Unexamined Patent Application Publication No. 2004-527424
Patent document 2: Japanese Patent Application Laid-Open Publication No. 06-23758

DISCLOSURE OF THE INVENTION

Problems to be Solved by the Invention

However, for such a composite container 104 disclosed in Patent document 1, a material of the core container 100 is a glass or a metal, thereby restricting processability to a certain degree. Consequently, a degree of freedom for a design is insufficient and not satisfactory.

The glass container 100 in such a composite container 104 is covered by the resin sheathing body 102. However, since the core container 100 is made of a glass, a damage caused by a drop cannot be prevented in many cases.

The composite container 104 is made of a combination of different materials composed of a glass and a resin. Consequently, the glass and the resin must be separated in a disposal, thereby involving a disadvantage in relation to a recycle property.

For the synthetic resin hollow body 206 disclosed in Patent document 2, a thickening material such as a super absorbent resin is injected into the inner shell 200 in advance, and is frozen and hardened to be a core material 204 before set in a metal mold 208, in such a manner that the inner shell 200 is prevented from being deformed or damaged by a resin pressure of a molten resin in the case in which a molten resin is injected outside the inner shell 200 in an integrating manner. After an integrating molding with the inner shell 200, the core material 204 in the inner shell 200 must be molten and removed. Consequently, there are many complicated operation processes.

Before the synthetic resin hollow body 206 is used, a thickening material that has adhered inside the inner shell 200 must be cleaned, thereby deteriorating productivity.

Moreover, although this method can suppress a resin cost, an operation cost is increased disadvantageously.

The present invention was made in consideration of such conditions, and an object of the present invention is to provide a manufacturing method of a synthetic resin hollow body capable of suppressing a product cost and an operation cost.

Means for Solving the Problems

The present invention was made in order to solve the above problems of the conventional art. A manufacturing method of a synthetic resin hollow body (A) in which a molten resin is injected for an over-molding outside a hollow molding body (a) made of a resin provided with a hollow body and at least an opening portion to form a resin sheathing body in an integrating manner with the hollow molding body (a) in accordance with the present invention is characterized by comprising the step of injecting the molten resin for an over-molding under the state in which the hollow molding body (a) is partially or wholly filled with a fluid substance.

By such a configuration, the hollow molding body (a) can be prevented from being deformed by a resin pressure in molding, thereby manufacturing the synthetic resin hollow body (A) in which an external surface of the hollow molding body (a) is reliably covered by the resin sheathing body in an integrating manner.

The manufacturing method of a synthetic resin hollow body (A) in accordance with the present invention is characterized in that the resin sheathing body is preferably welded to an external surface of the hollow molding body (a).

As described above, the resin sheathing body is welded to an external surface of the hollow molding body (a), thereby preventing the hollow molding body (a) from wobbling or rotating inside the resin sheathing body.

Moreover, the boundary line between the both members is hardly visible, thereby obtaining the synthetic resin hollow body (A) having an improved aesthetic appreciation.

The manufacturing method of a synthetic resin hollow body (A) in accordance with the present invention is characterized by comprising the steps of filling partially or wholly the hollow molding body (a) with a liquid as a fluid substance; attaching a cap member to the opening portion; setting the hollow molding body (a) holding the liquid inside to a metal mold; and injecting a molten resin for an over-molding, wherein the liquid is one of water, an aqueous solution, a cosmetic solution, a chemical, and an organic solvent.

By attaching the cap member to the opening portion as described above, a fluid substance (a liquid in particular) can be prevented from scattering externally out of the opening portion, and the hollow molding body (a) can be safely set to a metal mold even in the case in which the fluid substance such as a chemical accompanied by a danger in a handling is used.

As described above, since the fluid substance is a liquid, the hollow molding body (a) can be prevented from being deformed by a resin pressure in molding, thereby manufacturing the synthetic resin hollow body (A) in which an external surface of the hollow molding body (a) is reliably covered by the resin sheathing body in an integrating manner.

Moreover, in the case in which the fluid substance is water, after the synthetic resin hollow body (A) is manufactured, only removing water and drying enable a desired cosmetic solution or the like to be newly held, thereby facilitating the manufacturing.

Furthermore, in the case in which the hollow molding body (a) is filled with a cosmetic solution or the like to be held in advance in molding, the synthetic resin hollow body (A) can be a product for a market immediately after the manufacturing, thereby further facilitating the manufacturing process.

The manufacturing method of a synthetic resin hollow body (A) in accordance with the present invention is characterized in that a boiling point of the liquid is preferably at least 50° C.

By setting a boiling point of the liquid as described above, the liquid can be prevented from being vaporized in a metal mold in molding, thereby manufacturing the synthetic resin hollow body (A) in which an external surface of the hollow molding body (a) is safely and reliably covered by the resin sheathing body in an integrating manner.

The manufacturing method of a synthetic resin hollow body (A) in accordance with the present invention is characterized in that the fluid substance is a gas preferably.

As described above, since the fluid substance to be filled in the hollow molding body (a) is a gas, the synthetic resin hollow body (A) can be a product for a market immediately after the over-molding, thereby further improving productivity as compared with the case in which the fluid substance is a liquid.

The manufacturing method of a synthetic resin hollow body (A) in accordance with the present invention is characterized in that the gas is preferably one of air, nitrogen, oxygen, an inert gas, and a carbon dioxide gas.

In the case in which the gas is one of the above gases, the hollow molding body (a) can be reliably prevented from being deformed by an injection pressure in an injection.

The manufacturing method of a synthetic resin hollow body (A) in accordance with the present invention is characterized in that the gas is blown into the hollow molding body (a) in an injection of the molten resin, and a gas pressure in the hollow molding body (a) in a period of a cooling of the molten resin is preferably held to be lower than the blowing pressure of the gas blown in the injection of the molten resin in the case in which the molten resin is injected into the metal mold.

By adjusting a gas pressure in the hollow molding body (a) in an injection of the molten resin and in a cooling of the molten resin as described above, the hollow molding body (a) can be prevented from being deformed by an injection pressure in an injection, and a distortion can be reliably prevented from being generated between the hollow molding body (a) and the resin sheathing body in a cooling.

The manufacturing method of a synthetic resin hollow body (A) in accordance with the present invention is characterized in that a pressure of the gas to be blown into the hollow molding body (a) is preferably in the range of 0.04 to 1.0 MPa in a period from the start to the end of the injection of the molten resin.

By adjusting a gas pressure in the range as described above, the hollow molding body (a) can be effectively prevented from being deformed by a resin pressure.

The manufacturing method of a synthetic resin hollow body (A) in accordance with the present invention is characterized in that a pressure of the gas in the hollow molding body (a) is preferably in the range of 0.02 to 0.5 MPa in a period of the cooling of the molten resin.

By adjusting a gas pressure in the range as described above, a distortion can be reliably prevented from being generated between the hollow molding body (a) and the resin sheathing body in cooling the resin.

The manufacturing method of a synthetic resin hollow body (A) in accordance with the present invention is characterized in that a molding temperature is in the range of 100° C. to 300° C. and an injection pressure is in the range of 20 to 150 kg/cm$^2$ preferably in the case in which the molten resin is injected into the metal mold.

By setting the conditions for the metal mold in the range as described above, the fluid substance can be prevented from being vaporized in a metal mold in molding, thereby manufacturing the synthetic resin hollow body (A) in which an external surface of the hollow molding body (a) is safely and reliably covered by the resin sheathing body in an integrating manner.

The manufacturing method of a synthetic resin hollow body (A) in accordance with the present invention is characterized in that the molten resin to be injected into the metal mold is preferably an ionomer resin.

By using such a resin for a molding as described above, the hollow molding body (a) is clearly visible via the resin sheathing body. In addition, the resin sheathing body has an extremely high transparency, thereby greatly improving a high quality sense, an aesthetic appreciation, and an appearance property.

The manufacturing method of a synthetic resin hollow body (A) in accordance with the present invention is characterized in that the hollow molding body (a) is preferably formed by a blow molding method or a method of welding two divided molding bodies using a vibration welding method.

By forming the hollow molding body (a) by such a method as described above, a mass production is possible and a manufacturing cost can be reduced, thereby also manufacturing the synthetic resin hollow body (A) in which an external surface of the hollow molding body (a) is covered by the resin sheathing body in an integrating manner at a low cost.

The manufacturing method of a synthetic resin hollow body (A) in accordance with the present invention is characterized in that the hollow molding body (a) is a thin-walled molding body preferably.

As described above, since the hollow molding body (a) is a thin-walled molding body, in the case in which the hollow molding body (a) is integrated with the resin sheathing body, the boundary line between the both members is hardly visible, thereby obtaining the synthetic resin hollow body (A) having an improved aesthetic appreciation.

Moreover, in the case in which a thin-walled molding body is formed by a blow molding method, productivity can be improved, and an amount of a resin to be used can be suppressed.

The manufacturing method of a synthetic resin hollow body (A) in accordance with the present invention is characterized in that a thickness of the resin sheathing body is at least 1 mm preferably.

As described above, since a thickness of the resin sheathing body is at least 1 mm, a dignity sense of a glass can be obtained, and the resin sheathing body can be formed in many kinds of shapes, thereby obtaining the synthetic resin hollow body (A) having an improved aesthetic appreciation.

The manufacturing method of a synthetic resin hollow body (A) in accordance with the present invention is characterized in that the hollow molding body (a) is a hollow molding container preferably.

As described above, since the hollow molding body (a) is a hollow molding container, a liquid material such as a cosmetic solution, a chemical, and drinking water does not leak and can be held reliably.

EFFECT OF THE INVENTION

The present invention can provide a manufacturing method of a synthetic resin hollow body (A) capable of suppressing a product cost and an operation cost by making a core hollow molding body (a) of a resin and by making a resin sheathing body of a highly transparent synthetic resin.

Moreover, an injection is carried out under the state in which a hollow molding body (a) is partially or wholly filled with a fluid substance. Consequently, even in the case in which the hollow molding body (a) is made of a resin, the hollow molding body (a) can be prevented from being deformed by an injection pressure, thereby obtaining the synthetic resin hollow body (A) in which the hollow molding body (a) is reliably covered by the resin sheathing body.

The present invention can also provide a manufacturing method of a synthetic resin hollow body (A) that has a satisfactory decorating property by making a core hollow molding body (a) of a resin and by making a resin sheathing body of a highly transparent synthetic resin.

Moreover, the present invention can provide a manufacturing method of a synthetic resin hollow body (A) that is hardly damaged even in the case in which the synthetic resin hollow body is dropped, by making a core hollow molding body (a) of a resin and by making a resin sheathing body of a highly transparent synthetic resin.

Furthermore, the present invention can provide a manufacturing method of a synthetic resin hollow body (A) that is not required to be separated in a disposal, thereby having a satisfactory recycle property, by making a core hollow molding body (a) of a resin and by making a resin sheathing body of a highly transparent synthetic resin.

In the case in which a core hollow molding body (a) is made of a thin glass and has a thin-walled flat bottom, a crack may easily occur during an over-molding of a resin sheathing body. However, the present invention adopts a hollow molding body (a) made of a resin, thereby facilitating an over-molding.

BRIEF DESCRIPTION OF THE DRAWINGS

FIG. 5(a) shows a hollow molding body (a) with a cap opened, and FIG. 5(b) shows the hollow molding body of FIG. 5(a) that holds a liquid as a fluid substance and that is closed by a cap member.

FIG. 6(a) shows a state in which a hollow molding body (a) is set in a metal mold, FIG. 6(b) shows a state in which the metal mold is closed, and FIG. 6(c) shows a state in which a resin sheathing body is filled with in such a manner that an external surface of the hollow molding body (a) is covered in an integrating manner with the resin sheathing body.

FIG. 7(a) shows a state in which the metal mold is opened, and FIG. 7(b) shows a state in which the synthetic resin hollow body (A) is detached from the metal mold.

FIG. 8(a) shows a state in which a hollow molding body (a) is set in a metal mold, FIG. 8(b) shows a state in which the metal mold is closed, and FIG. 8(c) shows a state in which a resin sheathing body is filled with in such a manner that an external surface of the hollow molding body (a) is covered in an integrating manner with the resin sheathing body.

FIG. 9(a) shows a state in which the metal mold is opened, and FIG. 9(b) shows a state in which the synthetic resin hollow body (A) is detached from the metal mold.

EXPLANATIONS OF LETTERS OR NUMERALS

Figure 1:
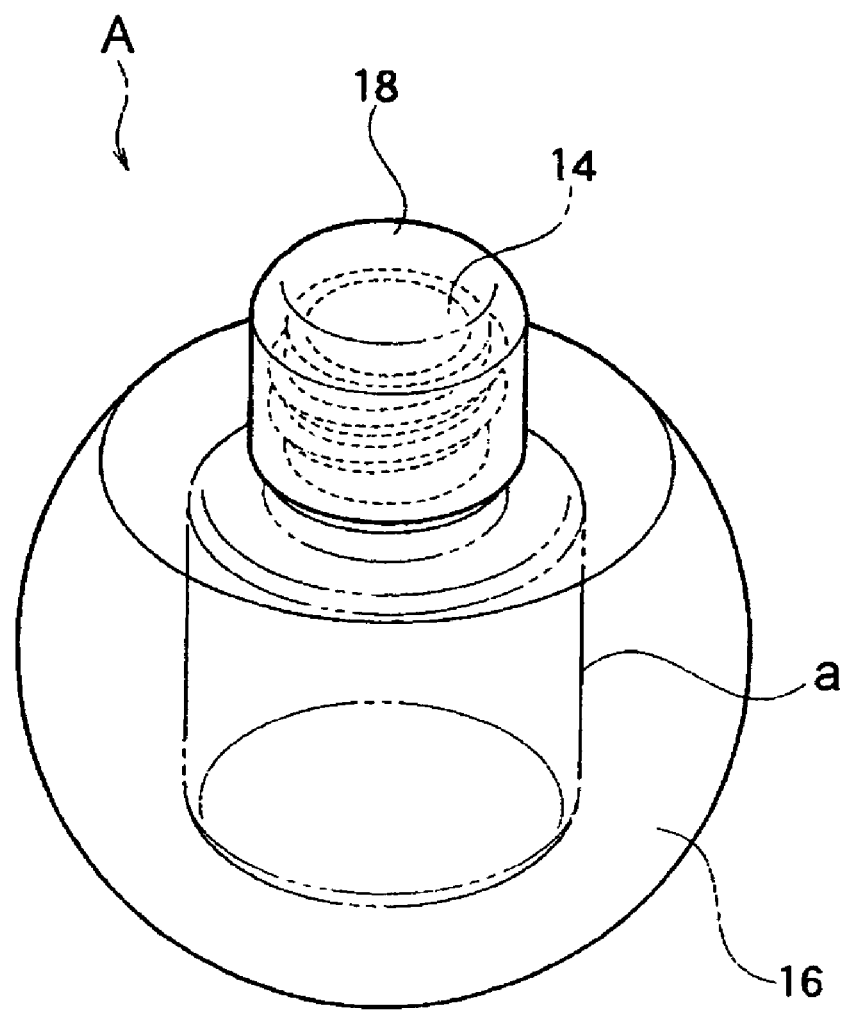
FIG. 1 is a perspective view showing a synthetic resin hollow body (A) in accordance with an embodiment of the present invention.

A: synthetic resin hollow body
a: hollow molding body

14: opening portion
16: resin sheathing body
18: cap member
20: convex and concave portion
22: liquid material
24: metal mold
26: metal mold
28: resin inflow port
30: liquid
32: gas
100: container
102: resin sheathing body
104: composite container
200: inner shell
202: over-molded portion
204: core material
206: synthetic resin hollow body
208: metal mold

BEST MODE OF CARRYING OUT THE INVENTION

An embodiment (example) of the present invention will be described below in detail with reference to the drawings.

Figure 2:
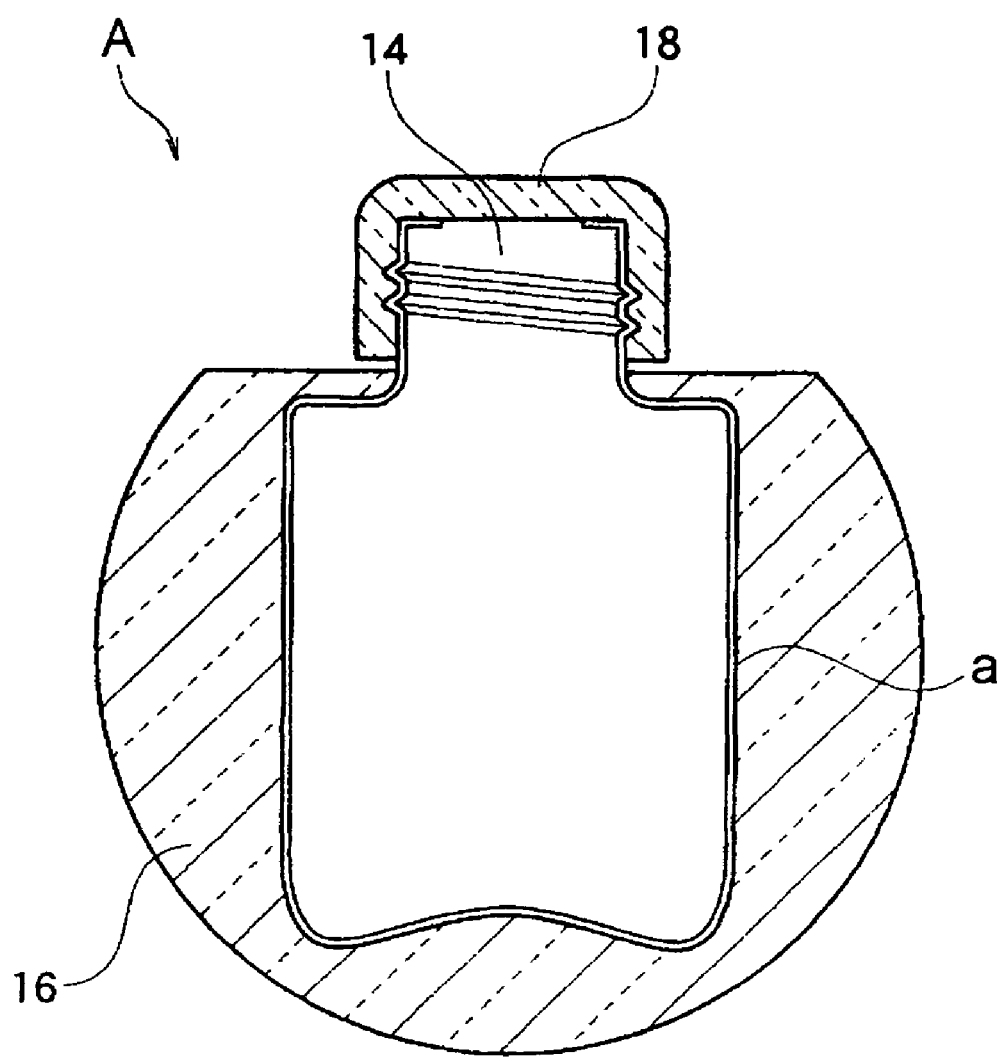
FIG. 2 is a cross-sectional view showing a synthetic resin hollow body (A) in accordance with an embodiment of the present invention.
Figure 3:
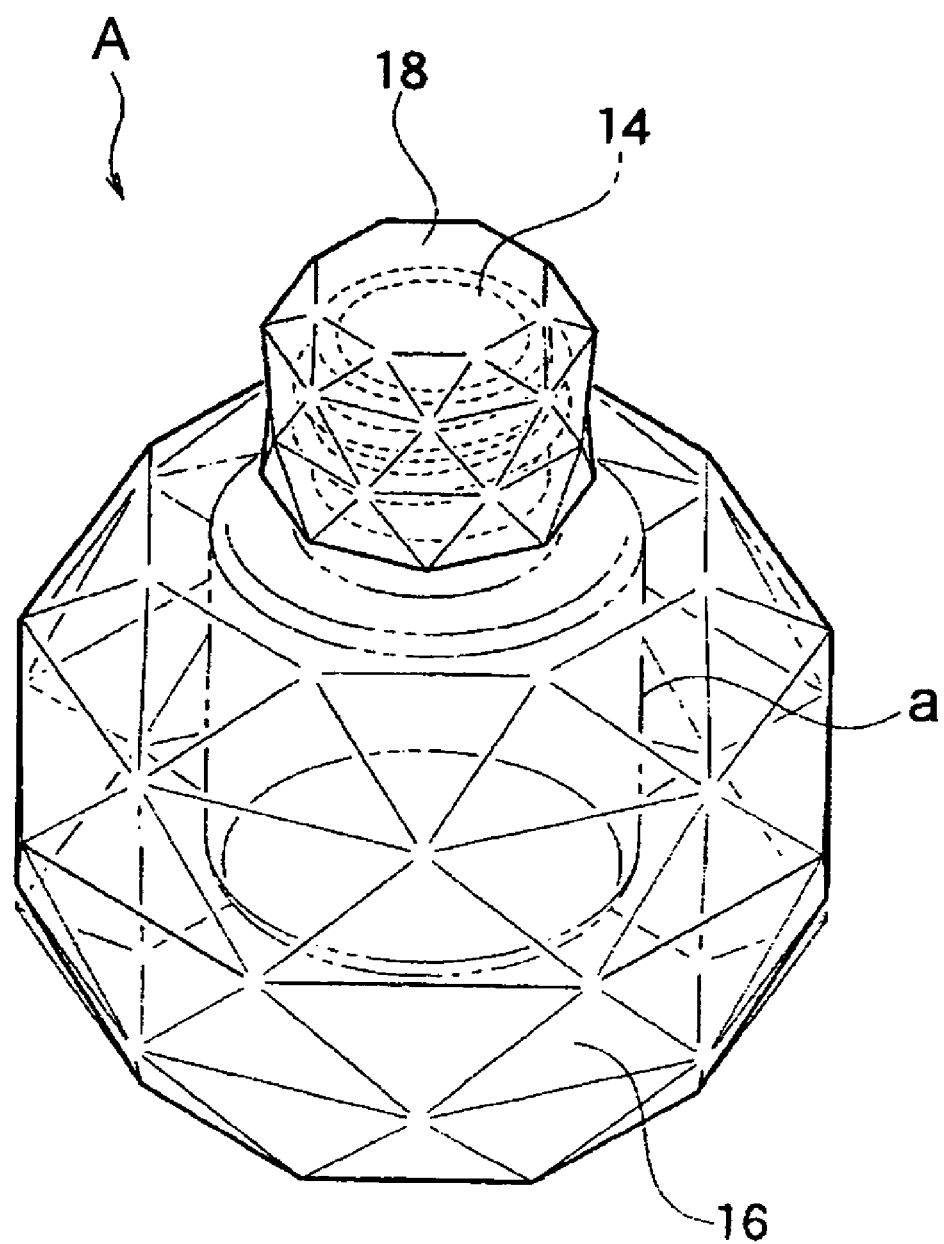
FIG. 3 is a perspective view showing a synthetic resin hollow body (A) in accordance with another embodiment of the present invention.
Figure 4:
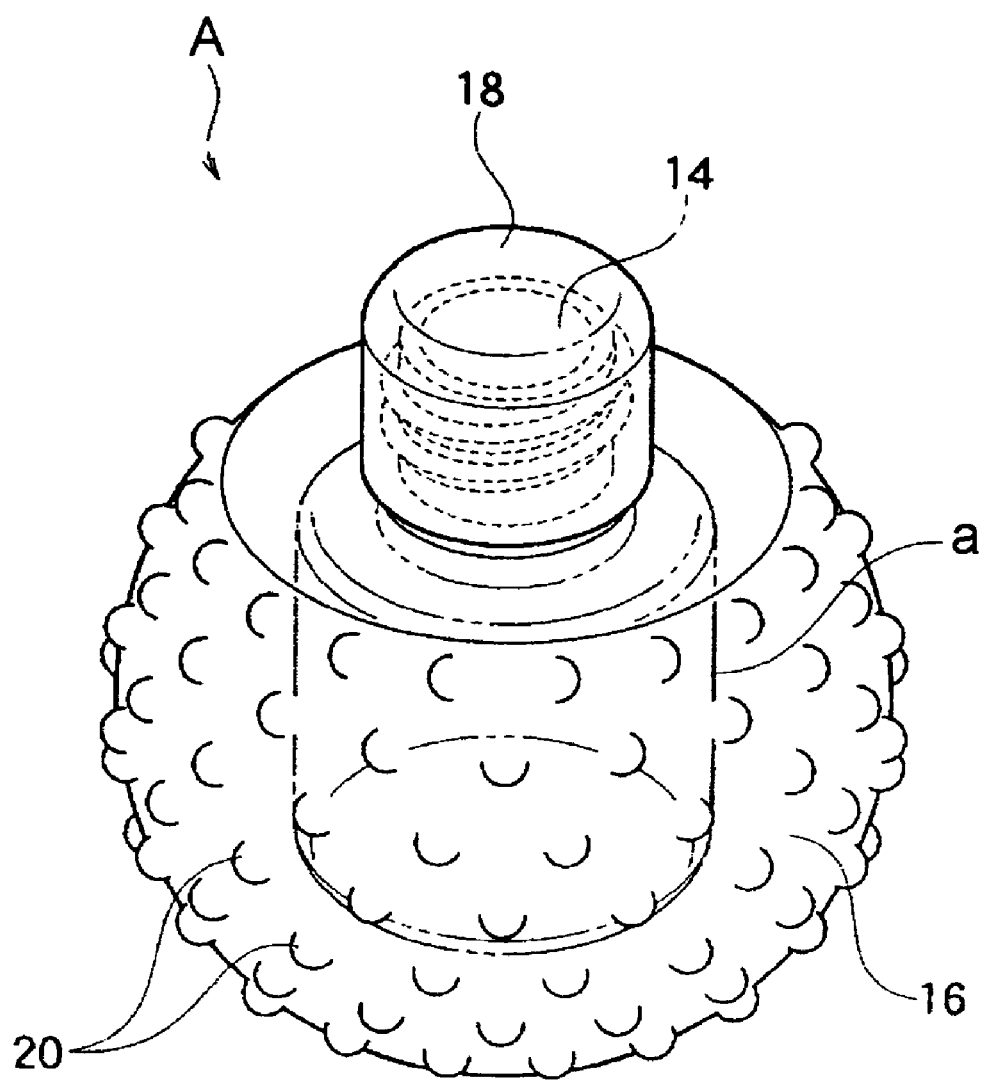
FIG. 4 is a perspective view showing a synthetic resin hollow body (A) in accordance with another embodiment of the present invention.
Figure 5:
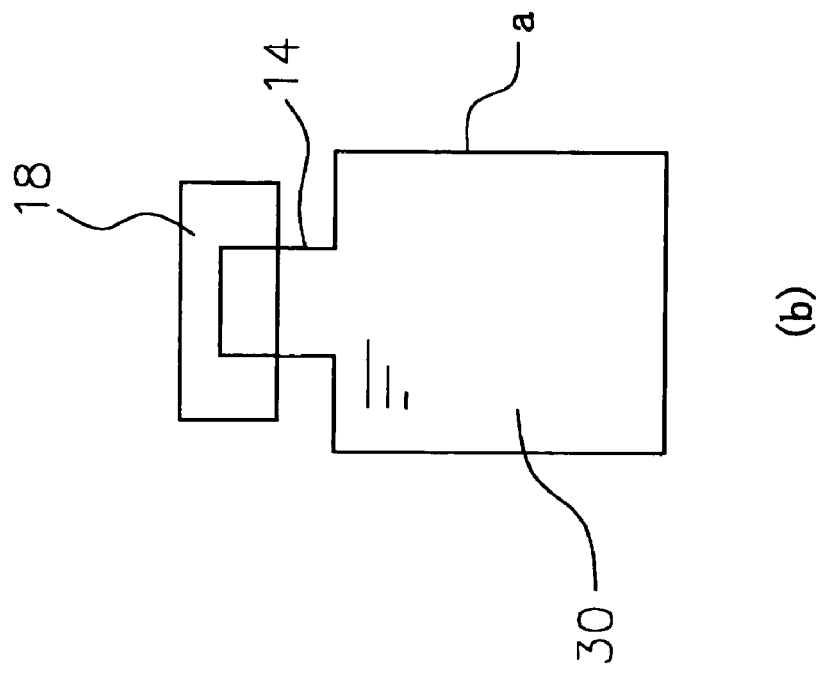
FIG. 5 shows a hollow molding body (a) in accordance with another embodiment of the present invention.
Figure 6:
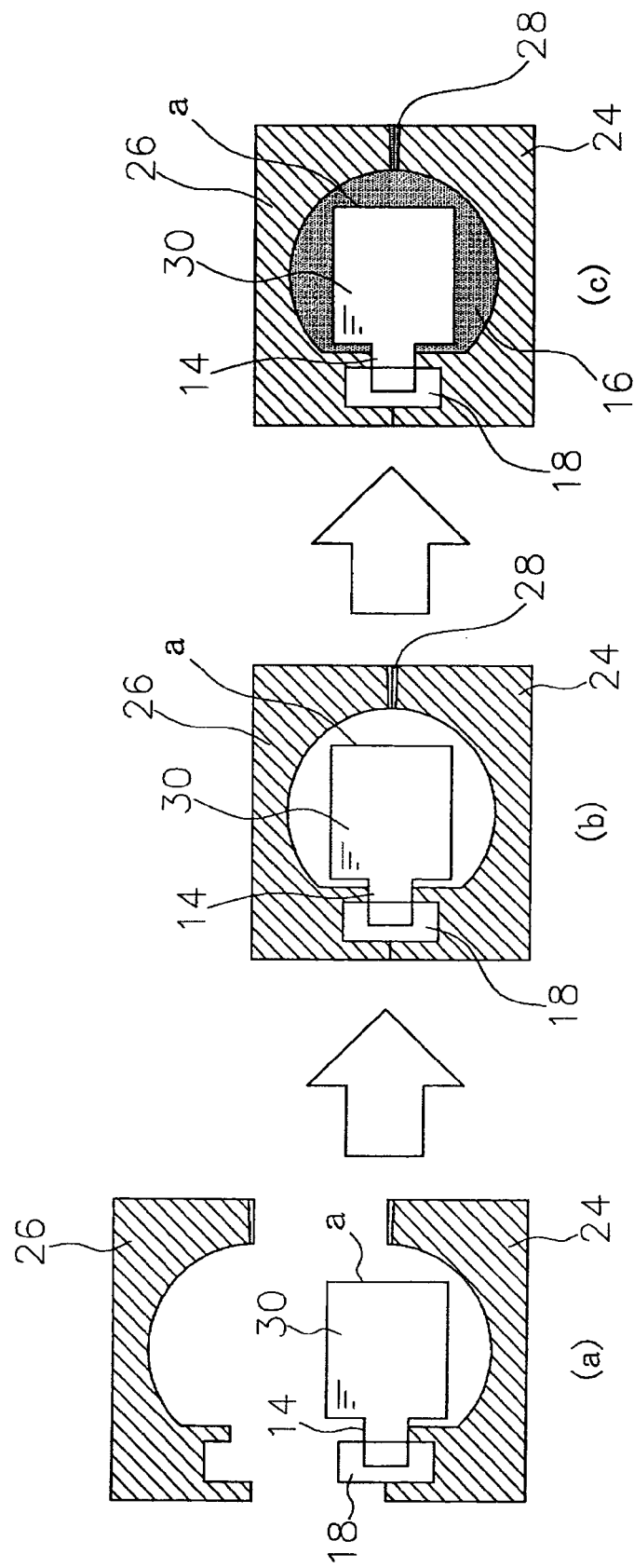
FIG. 6 illustrates a manufacturing method of a synthetic resin hollow body (A) in accordance with an embodiment of the present invention.
Figure 7:
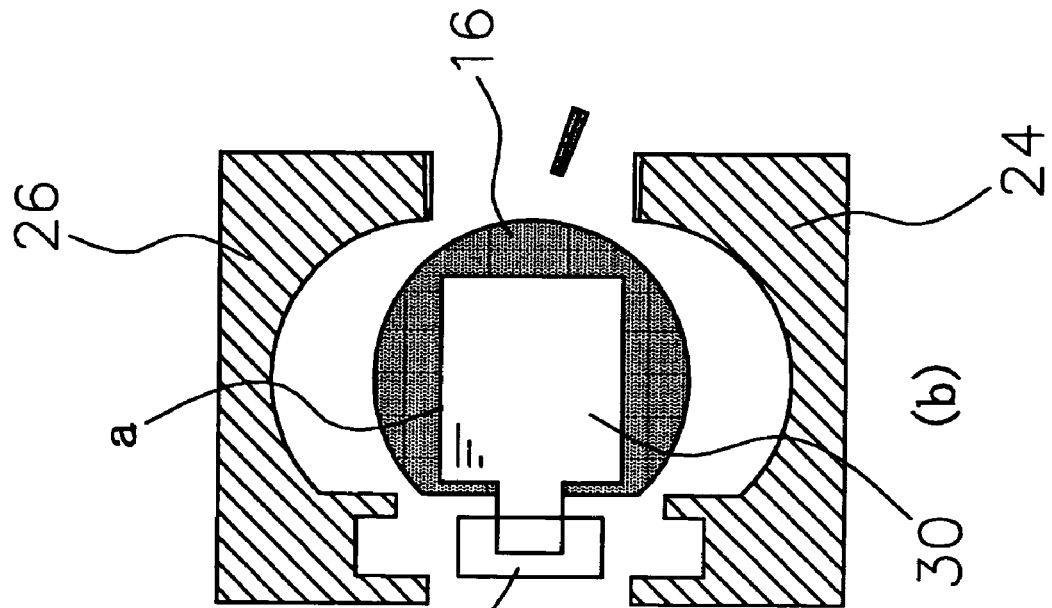
FIG. 7 illustrates a manufacturing method of a synthetic resin hollow body (A) in accordance with an embodiment of the present invention.
Figure 7:
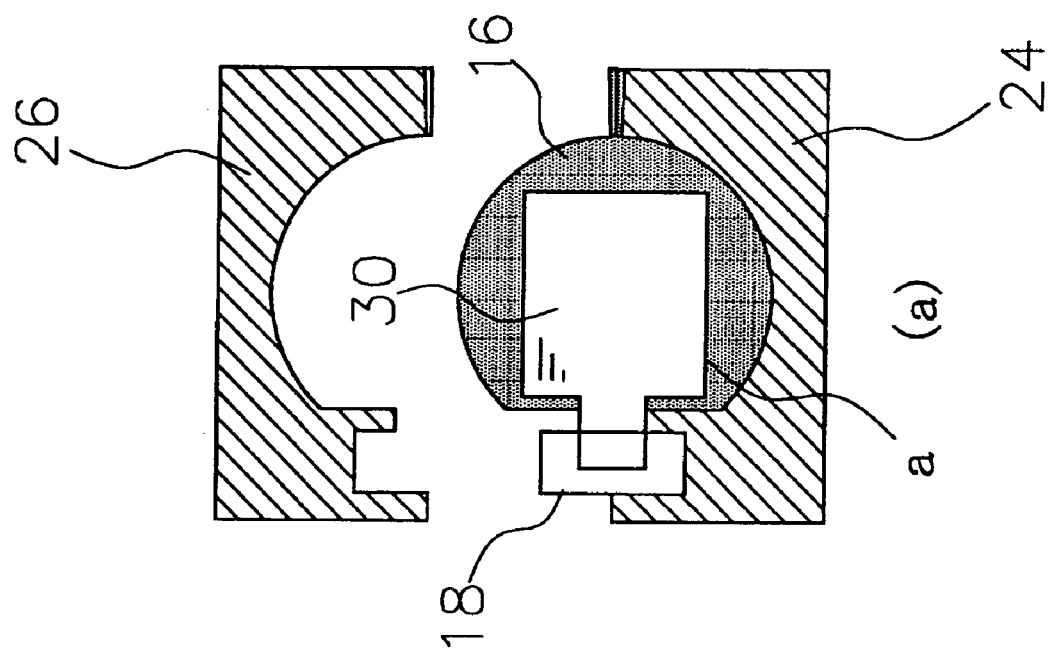

FIG. 1 is a view showing a synthetic resin hollow body (A) in accordance with an embodiment of the present invention. FIG. 2 is a cross-sectional view showing the synthetic resin hollow body (A) of FIG. 1. FIGS. 3 and 4 are views showing other embodiments of a synthetic resin hollow body (A). FIGS. 5 to 7 illustrate an embodiment of a method for manufacturing a synthetic resin hollow body (A).

<Synthetic Resin Hollow Body (A)>

A synthetic resin hollow body (A) in accordance with the present invention is for holding a liquid material having a flow property such as a cosmetic solution, a chemical, and drinking water.

As shown in FIG. 1, the synthetic resin hollow body (A) is composed of a hollow molding body (inner bottle) (a) provided with an opening portion 14 that is an inlet or an outlet for a liquid material 22 and a resin sheathing body 16 formed in such a manner that an external surface of the hollow molding body (a) is covered in an integrating manner with the resin sheathing body. That is, the resin sheathing body is over-molded around an external surface of the hollow molding body (a) in the present invention.

A cap member 18 is attached to the opening portion 14 of the hollow molding body (a) to prevent the liquid material 22 from scattering externally out of the opening portion 14. In this embodiment, the opening portion 14 and the cap member 18 are screwed to each other. However, the present invention is not restricted to such a configuration. For instance, the cap member 18 can also be fitted into the opening portion 14 in an inserting manner. After all, any configuration that can prevent the liquid material 22 from scattering externally out of the opening portion 14 of the hollow molding body (a) can also be adopted.

Moreover, the liquid material 22 that is held in the synthetic resin hollow body (A) can be, for instance, water, an aqueous solution, or a mixed solution of an oil component and an aqueous component such as a cosmetic solution, a chemical, and an organic solvent. In the present invention, the liquid material includes a pasty material.

As shown in FIG. 2, for such a synthetic resin hollow body (A), the resin sheathing body 16 is formed to cover the entire of the hollow molding body (a) from the bottom end of the opening portion 14.

In this embodiment, the resin sheathing body 16 is formed in a spherical shape to a shape of the hollow molding body (a). In addition, the resin sheathing body 16 can also be decorated as shown in FIG. 3. After all, any shape can be adopted for the resin sheathing body 16.

A character or a graphic can be printed on an external surface of the hollow molding body (a) before forming the resin sheathing body 16. In this case, the printed section of the hollow molding body (a) is protected by the resin sheathing body 16 at all times. Consequently, the printed section can be maintained to be clean as long as possible.

As shown in FIG. 4, a decorative convex and concave portion 20 can be formed on an external surface of the resin sheathing body 16. By such a configuration, the synthetic resin hollow body (A) can have an increased design variation, an aesthetic appreciation, and a high quality sense.

For such a synthetic resin hollow body (A), it is preferable to use a highly transparent synthetic resin as a material of the resin sheathing body 16. It is more preferable to use a synthetic resin having a total ray transmittance (conforming to JIS K7105, and measured with a sheet having a thickness of 1 mm) in the range of 80% to 100%, more preferably in the range of 85% to 100%.

As a material of a highly transparent synthetic resin that satisfies the above range of a transmittance, an ionomer resin, an acrylic resin, a polyester resin, and styrene resins (such as a styrene acrylonitrile copolymer resin and a styrene methylmethacrylate copolymer resin) can be used. Preferably, an ionomer resin and a polyester resin and ionomer resin can be used. More preferably, an ionomer resin can be used.

As an ionomer resin, a carboxyl group of an ethylene unsaturated carboxylic acid copolymer containing unsaturated carboxylic acid of 1 to 40 weight % can be used for instance. At least part (generally more than 0 mol % and up to 100 mol %, preferably up to 90 mol %) of the carboxyl group is neutralized by metal ions.

An ethylene unsaturated carboxylic acid copolymer that is a base polymer of an ionomer resin can be obtained by copolymerizing ethylene, and unsaturated carboxylic acid, and optionally any other polar monomers. As unsaturated carboxylic acid, acrylic acid, methacrylic acid, fumaric acid, maleic acid, anhydrous maleic acid, monomethyl maleate, and monoethyl maleate can be mentioned. In particular, methacrylic acid is preferable.

As a polar monomer that optionally can be a copolymer component, vinyl ester such as vinyl acetate and vinyl propionate, unsaturated carboxylic acid ester such as methyl acrylate, ethyl acrylate, isopropyl acrylate, n-butyl acrylate, isobutyl acrylate, n-hexyl acrylate, iso-octyl acrylate, methyl methacrylate, dimethyl maleate, and diethyl maleate, and carbon monoxide can be mentioned. In particular, unsaturated carboxylic acid ester is a suitable copolymer component.

The metal ion is a metal ion having a valence of monovalence, bivalence, or trivalence, in particular, a metal ion having a valence of monovalence, bivalence, or trivalence of the groups IA, IIA, IIIA, IVA, and VIII in the element periodic law. More specifically, there can be mentioned $Na^+$, $K^+$, $Li^+$, $Cs^+$, $Ag^+$, $Hg^+$, $Cu^+$, $Be^{++}$, $Mg^{++}$, $Ca^{++}$, $Sr^{++}$, $Ba^{++}$, $Cu^{++}$, $Cd^{++}$, $Hg^{++}$, $Sn^{++}$, $Pb^{++}$, $Fe^{++}$, $Co^{++}$, $Ni^{++}$, $Zn^{++}$, $Al^{+++}$, $Sc^{+++}$, $Fe^{+++}$, and $Y^{+++}$.

The above materials are excellent in a transparency, a shock resistance, and a mar-proof property. In addition, a thick-walled molding is possible and a dignity sense of a glass can be obtained. Consequently, these materials are suitable for a material of the resin sheathing body 16. In the present invention, it is preferable that a thickness of the resin sheathing body 16 is at least 1 mm.

Any resin material can be used for the hollow molding body (a) and the cap member 18. For instance, a polyolefin resin, polyolefin resin (such as polyethylene, polypropylene), polyester (such as PET (polyethylene terephthalate), PETG, PEGT, PCT (polycyclohexane dimethyl naphthalate), PCTA, PEN (polyethylene naphthalate)), acrylic resin, styrene resin (such as a styrene acrylonitrile copolymer resin, styrene methyl methacrylate copolymer resin), cycloolefin polymer, polycarbonate, polyamide, ionomer resin, and PAN (polyacrylonitride) can be used. In the case in which a material the same as that of the resin sheathing body 16 is used, a synergistic effect with the resin sheathing body 16 can be obtained, thereby improving a high quality sense, an appearance property, and an aesthetic appreciation.

As described later, the hollow molding body (a) is set in a metal mold, and a molten resin is flown into the metal mold and on an external surface of the hollow molding body (a) to form the resin sheathing body 16. Consequently, it is preferable that the hollow molding body (a) is made of polyester or polyamide that has a comparatively high melting temperature in the case in which a highly transparent synthetic resin is used.

In the case in which the liquid material 22 that is held in the hollow molding body (a) is a chemical, it is preferable to use polyethylene or polypropylene that has a comparatively excellent chemical resistance in highly transparent synthetic resins.

Similarly to the above hollow molding body (a), for the cap member 18, it is preferable to use polyethylene or an ionomer resin that has a comparatively excellent chemical resistance in highly transparent synthetic resins since the cap member 18 may partially come into contact with the chemical.

Such a highly transparent synthetic resin may be colored or may have no color. Moreover, the hollow molding body (a), the resin sheathing body 16, and the cap member 18 can have different colors from each other. As a matter of course, in the case in which the hollow molding body (a) is a hollow molding body formed by a method of welding two molding bodies using a vibration welding method, the two molding bodies having different colors can be welded to form the hollow molding body (a).

In the case in which a blue highly transparent synthetic resin in which Heliogen Blue K6911D (manufactured by BASF Company) is contained in ionomer is used for molding, the material can be colored to be blue.

Even in the case in which a character or a graphic is generated on a surface of the hollow molding body (a), the character or the graphic that has been generated on the hollow molding body (a) is visible reliably from the outside of the resin sheathing body 16 by using such a highly transparent synthetic resin. Consequently, a high quality sense, an aesthetic appreciation, and an appearance property can be improved for the synthetic resin hollow body (A).

Moreover, in the case in which a light reflecting powder (not shown) is dispersed in the highly transparent synthetic resin, a light is reflected from the light reflecting powder and glitters, thereby further improving a high quality sense.

As such a light reflecting powder, it is preferable to use a light reflecting powder in which a metal or metal oxide is coated on a surface of mica that is a core of the light reflecting powder.

<Manufacturing Method of the Synthetic Resin Hollow Body (A)>

Subsequently, the manufacturing method of the synthetic resin hollow body (A) in accordance with the present invention will be described below.

As shown in FIG. 5(*a*), a hollow molding body (a) is prepared at first. The hollow molding body (a) is previously manufactured by a blow molding method or by a method of forming two divided molding bodies in advance and welding the two bodies using a vibration welding method. The manufacturing method is not restricted in particular. In the case in which a blow molding is carried out, the hollow molding body (a) can be a thin-walled molding body, and a thickness of the wall is preferably in the range of 0.1 to 10 mm, more preferably in the range of 0.2 to 8 mm.

As shown in FIG. 5(*b*), liquid 30 is then flown as a fluid substance into the hollow molding body (a) via an opening portion 14, and a cap member 18 is attached to the opening portion 14. The liquid 30 to be filled with should be at least 50% of the total amount that can be flown into the hollow molding body (a), preferably at least 70%, in such a manner that the hollow molding body (a) is prevented from being deformed by a resin pressure in the case in which the hollow molding body (a) is set in metal molds 24 and 26 described later and a molten resin is flown into the metal molds.

The liquid 30 is heated in the metal molds 24 and 26 to a certain degree. Consequently, it is preferable that such liquid 30 has normal physical properties even if heated.

In the case in which abnormal physical properties may occur by heating, the liquid 30 that can be heated such as water is flown into the hollow molding body (a) and removed after a resin filling, and a desired liquid material 22 is then held in the hollow molding body (a).

As a matter of course, a desired liquid material 22 can also be held in the hollow molding body (a) in advance in such a state. However, the desired liquid material 22 is heated in the metal molds 24 and 26 to a certain degree as described above. Consequently, only in the case in which abnormal physical properties do not occur for the liquid material 22, the desired liquid material 22 can be held in the hollow molding body (a) in advance.

The liquid 30 to be used in molding is preferably water or alcohol in such a manner that it is not required to wash the hollow molding body (a) and that the hollow molding body (a) is only dried after the synthetic resin hollow body (A) is manufactured and the liquid 30 is removed from the hollow molding body (a).

As shown in FIG. 6(*a*), the hollow molding body (a) is then set in the metal molds 24 and 26 in such manner that a container portion of the hollow molding body (a) floats in a space in the metal molds 24 and 26.

In this embodiment, a cap member 18 is attached to the opening portion 14 of the hollow molding body (a) before the hollow molding body (a) is set in the metal molds 24 and 26. However, a gate (not shown) can be formed in the metal molds 24 and 26 in such a manner that the liquid 30 does not flow out of the opening portion 14 of the hollow molding body (a). In addition, a screw shape (not shown) can also be formed on the opening portion 14 of the hollow molding body (a) in advance and the opening portion 14 can be screwed into the metal molds 24 and 26. By such configurations, the hollow molding body (a) can be set in the metal molds 24 and 26 without attaching the cap member 18 to the hollow molding body (a).

As shown in FIG. 6(*b*), the metal molds 24 and 26 are then closed. As shown in FIG. 6(*c*), a highly transparent synthetic resin is filled in the metal molds 24 and 26 via a resin inflow port 28.

By such a process, the highly transparent synthetic resin that has been molten is over-molded on the periphery of the hollow molding body (a) from the bottom end of the opening portion 14 of the hollow molding body (a) in the metal molds 24 and 26.

As shown in FIG. 7(a), the metal molds 24 and 26 are opened after the highly transparent synthetic resin is hardened. As shown in FIG. 7(b), the synthetic resin hollow body (A) is detached from the metal molds 24 and 26, and a runner and a sprue are detached. The liquid 30 is then removed from the hollow molding body (a). As a result, the synthetic resin hollow body (A) in which a resin sheathing body 16 is formed in an integrating manner with the hollow molding body (a) can be obtained as shown in FIG. 1. In the case in which the hollow molding body (a) is not provided with the cap member 18, the liquid 30 is removed from the hollow molding body (a) after the synthetic resin hollow body (A) is detached from the metal molds 24 and 26, and the cap member 18 is attached to the opening portion 14 of the hollow molding body (a). By such a process, the synthetic resin hollow body (A) in which the resin sheathing body 16 is formed in an integrating manner with the hollow molding body (a) can be obtained similarly to the above. In this case, the resin sheathing body 16 is welded to an external surface of the hollow molding body (a), thereby preventing the hollow molding body (a) from wobbling or rotating in the resin sheathing body 16. Moreover, the boundary line between the both members is hardly visible, thereby obtaining an improved aesthetic appreciation and an improved appearance property.

In the present invention, a coating, a printing, or a hard coating can be carried out to the resin sheathing body 16 to impart a flaw resistance and a design property to the resin sheathing body 16.

By such a method, after the resin sheathing body 16 is filled with, the liquid 30 is removed from the hollow molding body (a), and a desired liquid material 22 is flown into the hollow molding body (a). Consequently, the synthetic resin hollow body (A) that holds the liquid material 22 can be manufactured. Therefore, it is unnecessary to adopt the conventional complicated processes such as defrosting the frozen liquid 30, removing the content, and filling with the liquid material 22. Accordingly, a manufacturing cost can be reduced.

Moreover, both the hollow molding body (a) and the resin sheathing body 16 are made of a resin. Consequently, the hollow molding body (a) and the resin sheathing body 16 are not required to be separated from each other in a disposal, thereby having a satisfactory recycle property.

Furthermore, after the synthetic resin hollow body (A) is manufactured, in the case in which the liquid 30 that has been held in the hollow molding body (a) in molding is removed and a desired liquid material 22 is newly held in the hollow molding body (a), water can be used as the liquid 30 that is held in the hollow molding body (a) in molding. Consequently, the inside wall of the hollow molding body (a) is only dried after removing water, thereby preventing the manufacturing process from being complicated and reducing a manufacturing cost of the synthetic resin hollow body (A).

Furthermore, the core hollow molding body (a) is made of a resin, and the resin sheathing body 16 is made of a highly transparent synthetic resin. Consequently, a high quality sense, an aesthetic appreciation, and an appearance property can be extremely improved for the synthetic resin hollow body (A).

Figure 8:
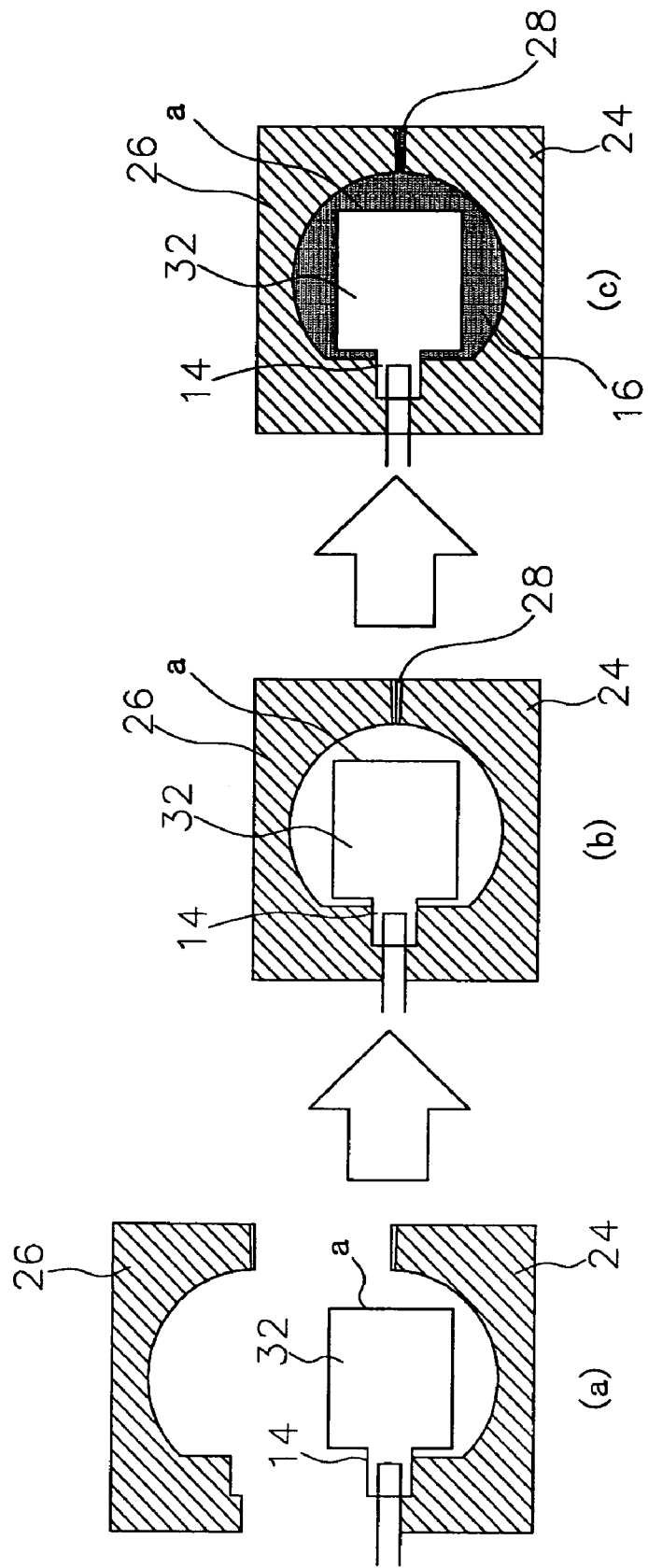
FIG. 8 illustrates a manufacturing method of a synthetic resin hollow body (A) in accordance with another embodiment of the present invention.

FIG. 8 illustrates another embodiment of a synthetic resin hollow body (A) in accordance with the present invention similarly to FIGS. 1 to 7.

The synthetic resin hollow body (A) shown in FIG. 8 has a configuration basically equivalent to that of the synthetic resin hollow body (A) of the embodiment shown in FIGS. 1 to 7. Consequently, elements equivalent to those illustrated in FIGS. 1 to 7 are numerically numbered similarly and the detailed descriptions of the equivalent elements are omitted.

A point different from the above embodiment for the manufacturing method of the synthetic resin hollow body (A) shown in FIG. 8 is that a gas 32 is used as a fluid substance.

In this case, as shown in FIG. 8(a), a hollow molding body (a) in an empty state is set in the metal molds 24 and 26, and the gas 32 is made to blow in an opening portion 14 of the hollow molding body (a). At this time, a pressure of the gas 32 that blows in the hollow molding body (a) is preferably in the range of 0.04 to 1.0 MPa. The gas 32 to be used is not restricted in particular. For instance, air, nitrogen, oxygen, an inert gas, and a carbon dioxide gas can be used. In particular, air is preferably used.

As shown in FIG. 8(b), the metal molds 24 and 26 are then closed while the gas 32 is made to blow in the hollow molding body (a). As shown in FIG. 8(c), a molten resin is flown into the metal molds 24 and 26 via a resin inflow port 28. By such a process, the molten resin covers the hollow molding body (a).

The molten resin is cooled and hardened by maintaining this state for a certain time. At this time, by reducing a pressure of the gas 32 that has blown in the hollow molding body (a) to make the pressure less than that at the resin filling, a resin sheathing body 16 can be formed in such a manner that an external surface of the hollow molding body (a) is covered in an integrating manner with the resin sheathing body 16 without a distortion generated between the hollow molding body (a) and the resin sheathing body 16. At this time, a pressure of the gas 32 is preferably reduced to the range of 0.02 to 0.5 MPa.

Figure 9:
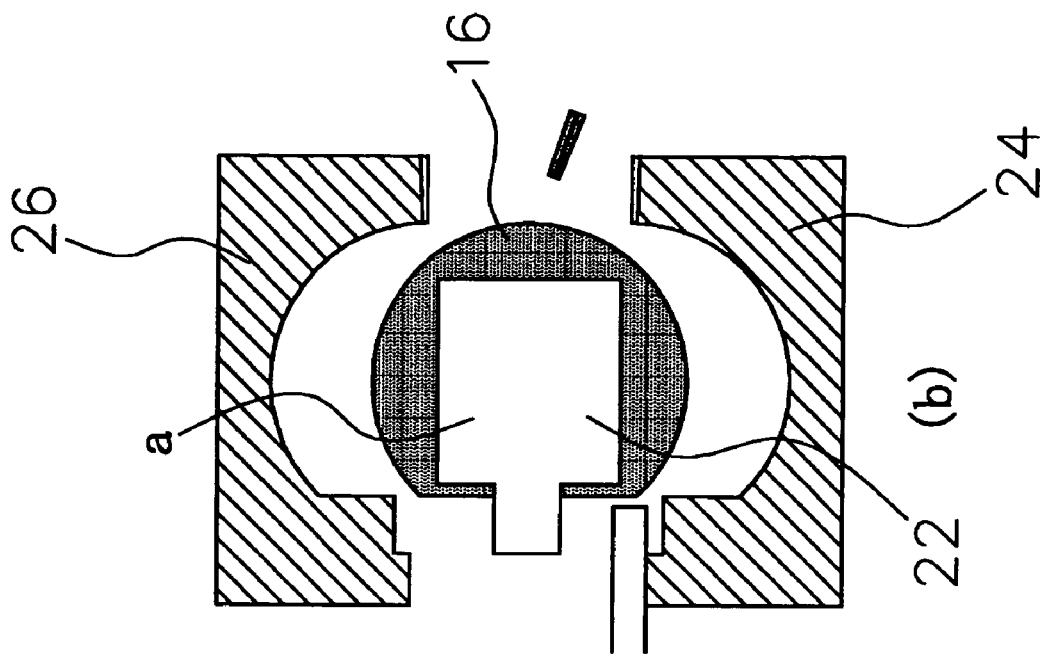
FIG. 9 illustrates a manufacturing method of a synthetic resin hollow body (A) in accordance with another embodiment of the present invention.
Figure 9:
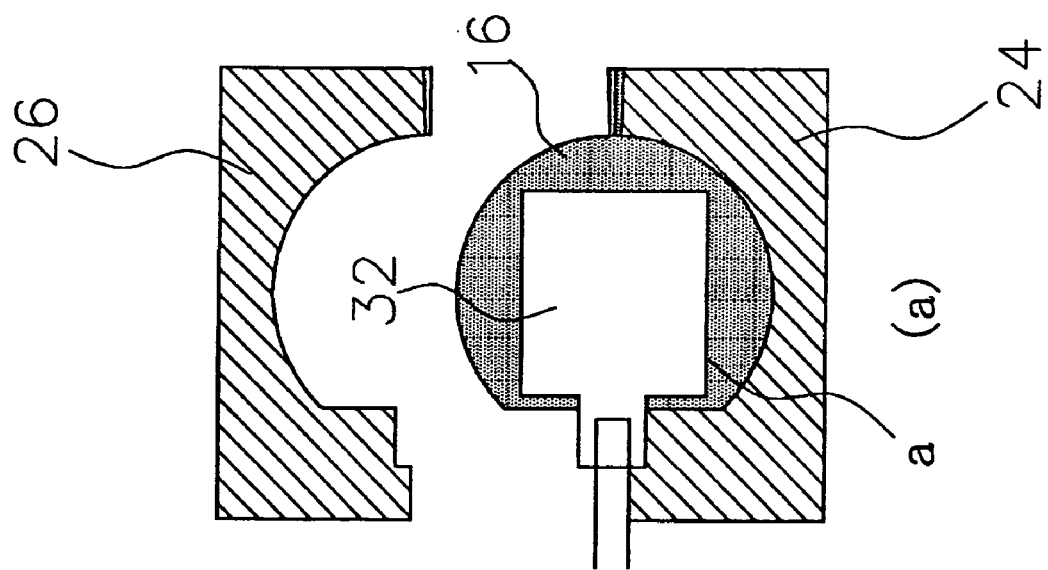
Figure 10:
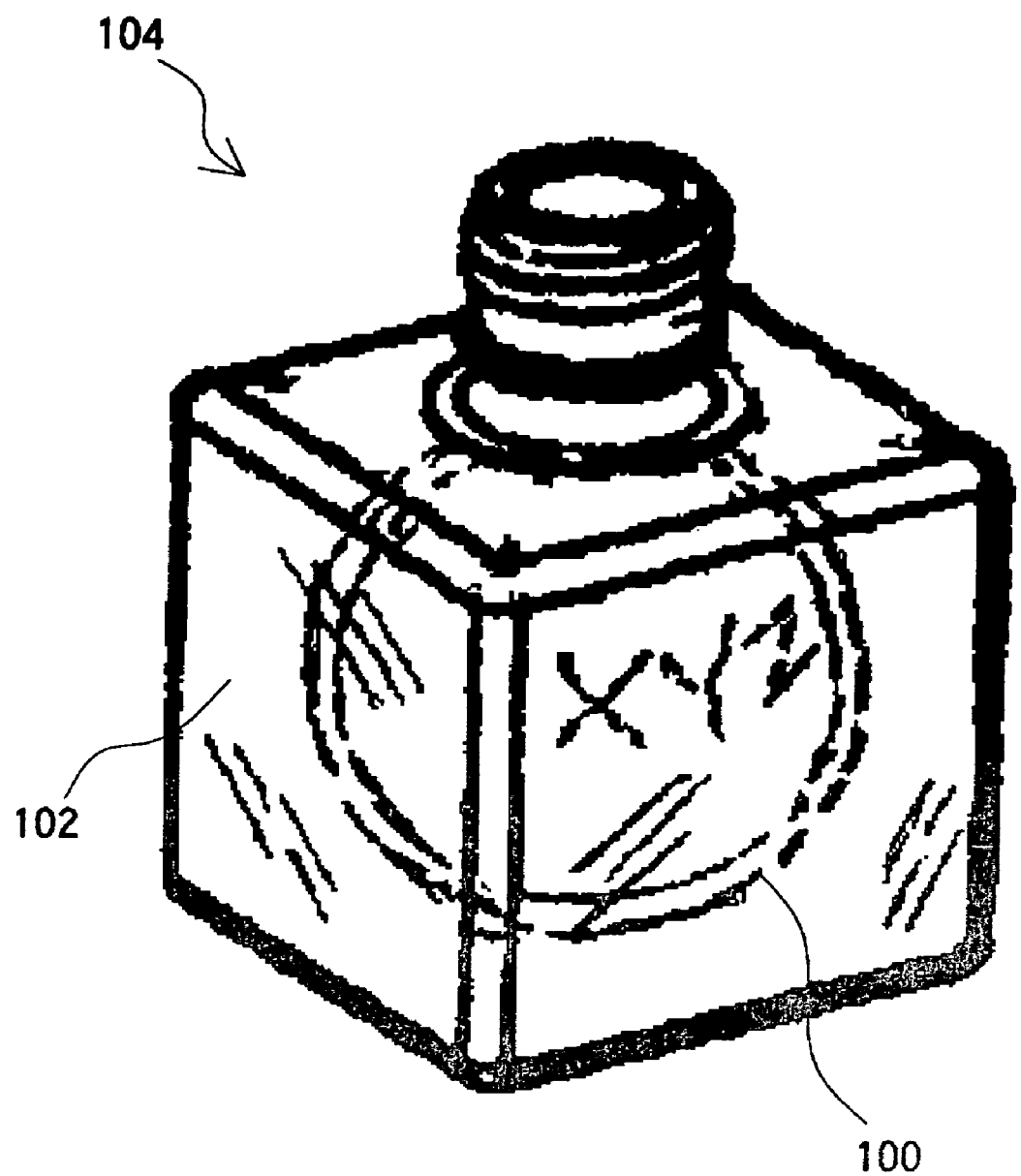
FIG. 10 is a perspective view showing a conventional composite container.
Figure 11:
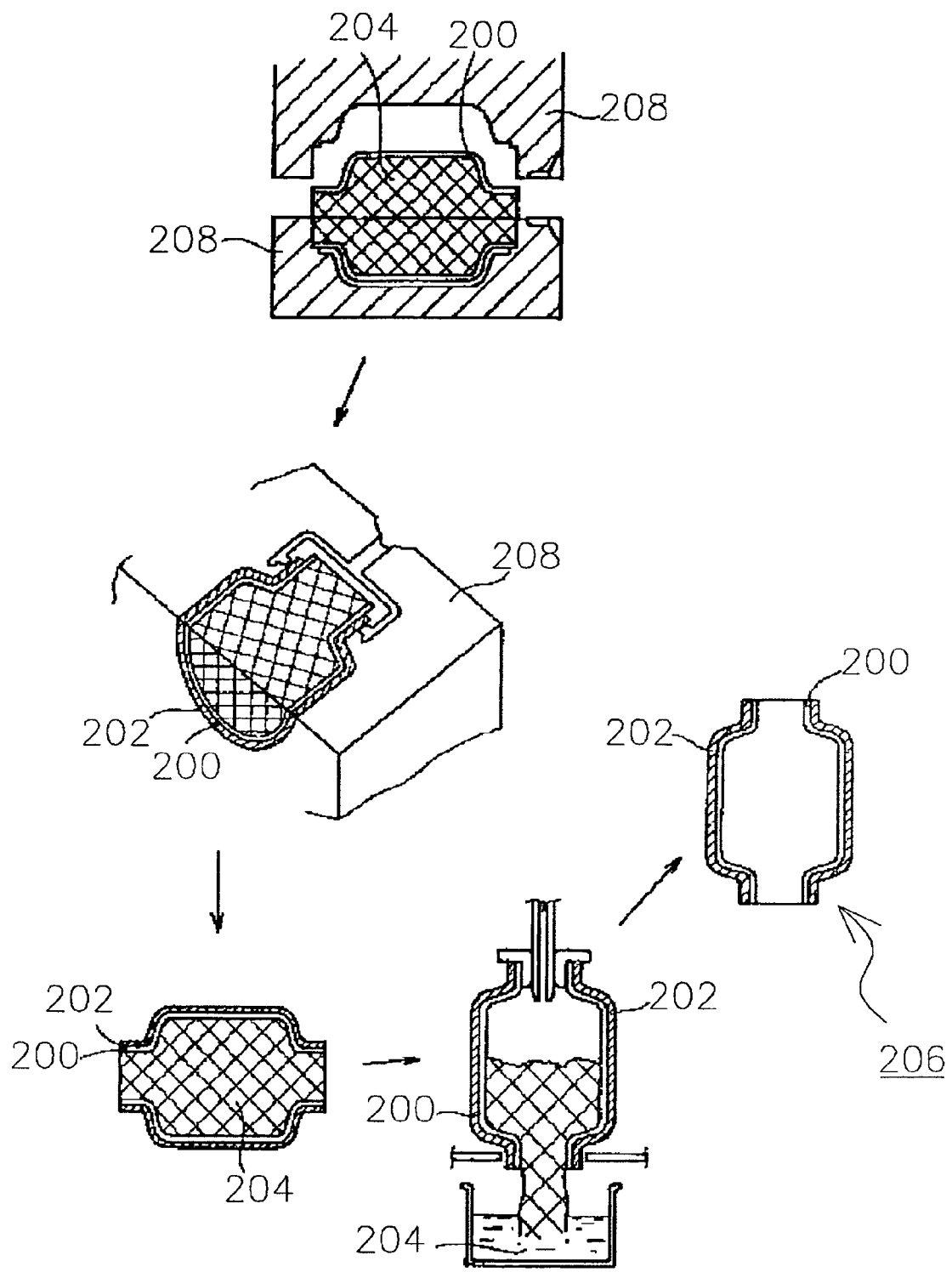
FIG. 11 is a process drawing illustrating a conventional manufacturing method of a synthetic resin hollow body (A).

As shown in FIG. 9(a), the metal molds 24 and 26 are then opened. As shown in FIG. 9(b), a runner and a sprue are detached, and a cap member 18 is attached to the opening portion 14. As a result, the synthetic resin hollow body (A) in which the resin sheathing body 16 is formed in an integrating manner with the hollow molding body (a) can be obtained.

In the manufacturing method in accordance with this embodiment, the gas 32 is just made to blow in the hollow molding body (a) in the over-molding on the hollow molding body (a). Consequently, a desired liquid material 22 can be held in the hollow molding body (a) immediately after the molding, thereby further reducing a manufacturing cost as compared with the above manufacturing method.

In the above manufacturing methods of the synthetic resin hollow body (A), the liquid 30 and the gas 32 are individually used as a fluid substance to be flown into the hollow molding body (a). However, a combined use of the liquid 30 and the gas 32 is also possible.

In this case, the liquid 30 is flown into the hollow molding body (a) by the range of 1% to 50%, preferably the range of 5% to 20%. The hollow molding body (a) is then set to the predetermined position in the metal molds 24 and 26 in such a manner that the opening portion 14 is located on the upper side without the cap member 18 attached to the opening portion 14 of the hollow molding body (a).

While the gas 32 having a pressure in the range of 0.04 to 1.0 MPa is made to blow (that is, the gas 32 is made to blow at the pressure in the range of 0.04 to 1.0 Mpa) in the hollow molding body (a) via the opening portion 14, a molten resin is flown into the metal molds 24 and 26 and hardened. As a result, the synthetic resin hollow body (A) in which an external surface of the hollow molding body (a) is covered by the resin sheathing body 16 in an integrating manner can be obtained.

In the case in which a combined use of the liquid 30 and the gas 32 is carried out for a fluid substance to be flown into the hollow molding body (a) as described above, it is not necessary to modify a blowing pressure of the gas 32 in the flowing of the molten resin and in the hardening of the molten resin. Moreover, a heat resistance and a pressure resistance of the hollow molding body (a) in molding can be improved as compared with the case of using only the gas 32. Furthermore, as compared with the case of using only the liquid 30, an amount of the liquid 30 to be filled in the hollow molding body (a) can be reduced, thereby facilitating an exhaust of the liquid 30 from the hollow molding body (a) after molding.

While the preferred embodiments of the present invention have been described above, the present invention is not restricted to the embodiments, and various changes and modifications can be thus made without departing from the scope of the present invention. For instance, a liquid and a gas are used as a fluid substance in this specification. However, the present invention is not restricted to this case, and powder or the like can also be used.

The invention claimed is:

1. A manufacturing method of a synthetic resin hollow body (A) in which a molten resin is injected for an over-molding outside a hollow molding body (a) which is made of a resin, is hollow inside and is provided with at least an opening portion to form a resin sheathing body in an integrating manner with the hollow molding body (a), which method comprising the steps of:
   setting the hollow molding body (a) to a metal mold,
   blowing a gas as a fluid substance into the hollow molding body (a) while injecting a molten resin into the metal mold for an over-molding over the hollow molding body (a), and
   cooling the injected molten resin wherein the gas pressure in the hollow molding body (a) in the cooling of the injected molten resin is held to be lower than the blowing pressure of the gas blown in the injection of the molten resin.

2. The manufacturing method of a synthetic resin hollow body (A) as defined in claim 1, wherein the pressure of the gas to be blown into the hollow molding body (a) is in the range of 0.04 to 1.0 MPa in a period from the start to the end of the injection of the molten resin.

3. The manufacturing method of a synthetic resin hollow body (A) as defined in claim 1, wherein the pressure of the gas in the hollow molding body (a) is in the range of 0.02 to 0.5 MPa in the cooling of the molten resin.

4. The manufacturing method of a synthetic resin hollow body (A) as defined in claim 1, wherein the gas is one of air, nitrogen, oxygen, an inert gas, and a carbon dioxide gas.

5. A manufacturing method of a synthetic resin hollow body (A) in which a molten resin is injected for an over-molding outside a hollow molding body (a) which is made of a resin, is hollow inside and is provided with at least an opening portion to form a resin sheathing body in an integrating manner with the hollow molding body (a), which method comprising the steps of:
   setting the hollow molding body (a) to a metal mold, and
   filling the hollow molding body (a) with a liquid and a gas as a fluid substance while injecting a molten resin into the metal mold for an over-molding over the hollow molding body (a).

6. The manufacturing method of a synthetic resin hollow body (A) as defined in claim 5, wherein the liquid is one of water, an aqueous solution, a cosmetic solution, a chemical, and an organic solvent and the gas is one of air, nitrogen, oxygen, an inert gas, and a carbon dioxide gas.

7. The manufacturing method of a synthetic resin hollow body (A) as defined in claim 5, wherein the pressure of the gas to be blown into the hollow molding body (a) is constant in a period from the start to the end of the injection of the molten resin and in a period form the end of the injection to the hardening of the molten resin.

8. The manufacturing method of a synthetic resin hollow body (A) as defined in claim 7, wherein the pressure of the gas to be blown into the hollow molding body (a) is in the range of 0.04 to 1.0 MPa.

* * * * *